United States Patent [19]

Milliser et al.

[11] Patent Number: 4,893,976

[45] Date of Patent: Jan. 16, 1990

[54] CLINCH TYPE FASTENING STRUCTURE

[75] Inventors: John S. Milliser, Rochester, Ind.; James T. McGuire, Royal Oak, Mich.

[73] Assignee: Textron Inc., Providence, R.I.

[21] Appl. No.: 162,681

[22] Filed: Mar. 1, 1988

[51] Int. Cl.[4] .......................... F16B 37/02; F16B 37/04
[52] U.S. Cl. ..................................... 411/180; 411/173
[58] Field of Search ............... 411/173, 176, 177, 179, 411/180, 181; 29/432.1, 432.2, 243.52

[56] References Cited

U.S. PATENT DOCUMENTS

| | | | |
|---|---|---|---|
| 3,800,401 | 4/1974 | Jesevich et al. | 29/432.2 |
| 3,877,133 | 4/1975 | Gruge | 29/432.2 |
| 4,389,766 | 6/1983 | Capuano | 411/179 |
| 4,555,838 | 12/1985 | Muller | 411/179 |
| 4,637,766 | 1/1987 | Milliser | 411/180 |

*Primary Examiner*—Neill R. Wilson
*Attorney, Agent, or Firm*—R. A. Giangiorgi

[57] ABSTRACT

An improved method and joint structure are provided for assembling a self-clinching fastener to sheet material, particularly thin sheet metal, in which an aperture and a peripheral flange are formed in the sheet metal; thereafter the shank portion of the fastener is inserted into the flange followed by clinching the fastener to the flange to secure the assembly. The sheet metal aperture and peripheral flange can be fabricated in a single work station in which the fabricating tooling punches the sheet metal aperture and extrudes or shapes the peripheral flange between a pair of forming dies. Assembly of the fastener joint with the flanged metal is performed in a second work station in which the fastener shank is inserted into the flange and then the head portion of the fastener is driven into the flange material to begin the clinching step. In the clinching operation the fastener head bends the flange material radially outwardly into engagement with the contiguous sheet metal to produce effectively doubled sheet metal thickness at the annular periphery of the aperture. Further driving the head portion into the bent flange displaces and cold-deforms a portion of the flange material radially inwardly into a locking groove provided in the inserted fastener shank to produce mechanical interlock of the clinched assembly.

4 Claims, 2 Drawing Sheets

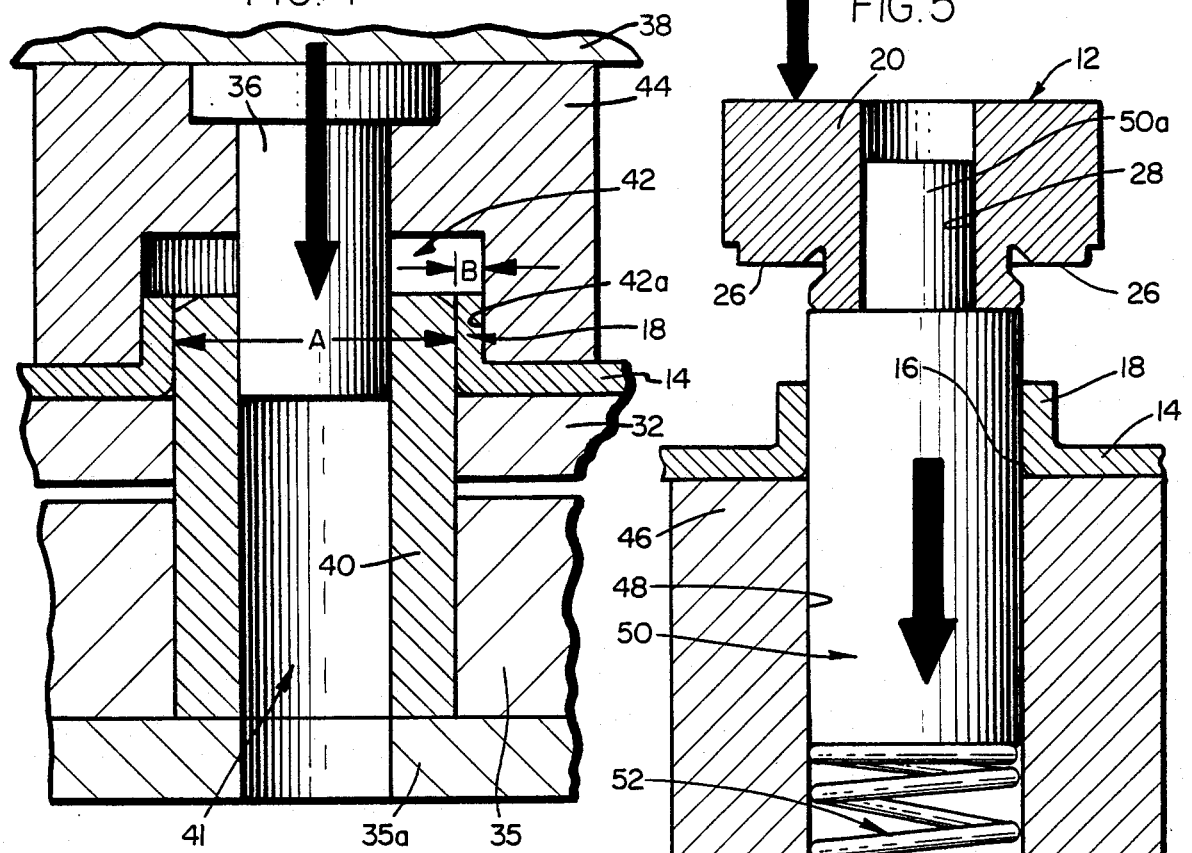

CLINCH TYPE FASTENING STRUCTURE

BACKGROUND OF THE INVENTION

This invention relates to self-clinching fasteners and assembly thereof with thin sheet materials such as sheet metal.

Self-clinching fasteners for typical sheet metal have been developed particularly for applications in which welding or threading are undesirable as the primary means of securing the joint, such as the self clinching fasteners marketed under the trademark STRUX®. For example, U.S. Pat. No. 3,967,669 describes fasteners having an enlarged head and a shank portion having a tapered extruding section of the type installed in a prepunched hole in the sheet metal which may be smaller than the extruding section of the shank. The shank extruding section is inserted and deforms a portion of the periphery of the sheet metal aperture to resize the aperture, preferably resulting in a rim formation on the aperture with the aperture walls closely overlying the retaining groove in the fastener. As the fastener head is driven into the sheet metal the rim or aperture material is displaced radially inwardly to fill the annular retaining groove provided in the fastener shank below the head which produces a firm mechanical interlock. In addition, the fastener head may include a plurality of radially arranged projections which, when embedded in the sheet material, prevent relative rotation and provide high torque resistance between the fastener and the sheet metal, particularly when the fastener is internally threaded to accept a second threaded fastener driven into the clinched fastener in a subsequent mounting operation.

In applications requiring very thin sheet metal, it has become difficult to achieve sufficient cold-flow deformation of sheet metal to fill the fastener retaining groove to produce the desired secure interlock which will resist rotation and dislodgement or push out of the fastener for dependable performance. This disadvantage in using very thin sheet metal is entirely eliminated by the improved fastener assembly method and joint provided by the present invention.

SUMMARY OF THE INVENTION

In accordance with aspects of the invention an improved method and joint structure are provided for assembling a self-clinching fastener to sheet material, particularly thin sheet metal, in which an aperture and a peripheral flange are formed in the sheet metal; thereafter the shank portion of the fastener is inserted into the flange followed by clinching the fastener to the flange to secure the assembly. Preferably the sheet metal aperture and peripheral flange are fabricated in a single work station in which the fabricating tooling punches the sheet metal aperture and extrudes or shapes the peripheral flange between a pair of forming dies.

Assembly of the fastener joint with the flanged metal is preferably performed in a second work station in which the fastener shank is inserted into the flange and then the head portion of the fastener is driven into the flange material to begin the clinching step. In the preferred clinching operation the fastener head bends the flange material radially outwardly into engagement with the contiguous sheet metal to produce effectively double walled sheet metal thickness at the annular periphery of the aperture. Further driving the head portion into the bent flange displaces and cold-deforms a portion of the flange material radially inwardly into a locking groove provided in the inserted fastener shank to produce mechanical interlock of the clinched assembly. Preferably the fastener head has a plurality of radially arranged projections which embed within the flange material to prevent relative rotation and promote torque resistance particularly when the fastener is an unthreaded nut which is tapped subsequent to the clinching assembly.

In another aspect of the invention the clinching operation is performed using tooling apparatus including a cylindrical guide member which is inserted through the sheet metal flange prior to inserting the fastener shank into the flange. The guide member preferably has an extension which is engaged with the fastener to provide aligning guidance in the clinching operation. The extension can project into the bore of a fastener nut. The guide member provides interior reinforcement of the flange to ensure that the flange is bent radially outwardly by the fastener head. The guide member also reinforces the peripheral material of the sheet metal aperture to promote the radially inward cold deformation of the flange material into the locking groove to insure complete filling of the groove and formation of an annular continuum of the mechanical interlock in the clinched joint.

In another aspect of the invention, tooling apparatus is provided for punching and shaping the flanged sheet metal aperture wherein the punching and shaping dies are provided in a particularly preferred single fabricating work station.

BRIEF DESCRIPTION OF THE DRAWINGS

FIG. 4 is a fragmentary sectional view similar to FIG. 3 illustrating the shaping of the flange of FIG. 1;

FIG. 5 is a vertical, sectional view of an embodiment of the tooling apparatus of the invention employed in the clinching operation to assemble the joint assembly of FIG. 2;

FIG. 6 is an enlarged, fragmentary sectional view of an intermediate step in the clinching operation, illustrating bending of the sheet metal flange; and FIG. 7 is a sectional view similar to FIG. 6 of a subsequent, intermediate step of the clinching operation, illustrating the doubled sheet metal thickness produced by bending the flange downwardly into engagement with the contiguous sheet metal at the aperture periphery, prior to completion of the clinched joint assembly of FIG. 2.

DESCRIPTION OF THE PREFERRED EMBODIMENTS

Figure 1:
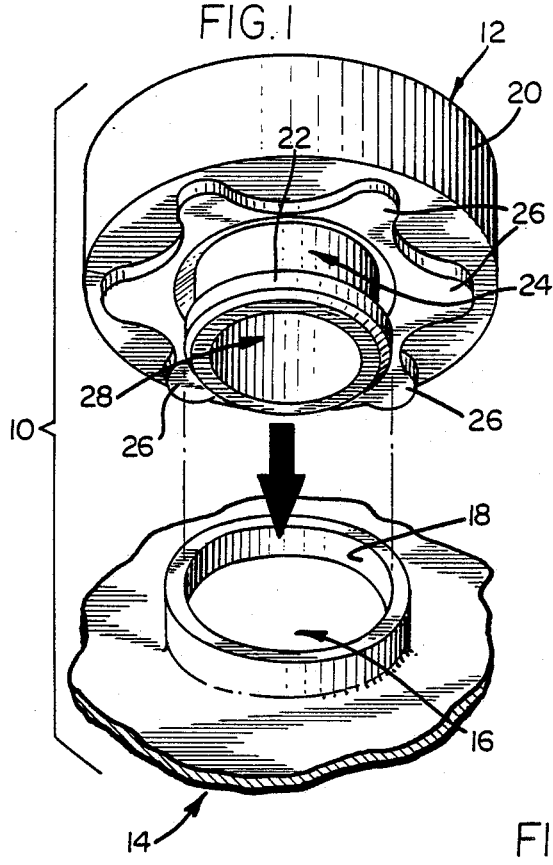
FIG. 1 is a perspective view of a self-clinching fastener nut and flanged sheet metal aperture which are assembled in one embodiment of the invention.

Referring now specifically to the drawings, FIG. 1 illustrates a preferred form of a fastener assembly of the invention immediately prior to formation of the fastener and sheet metal joint, which assembly is generally designated by reference 10. The assembly 10 includes a unitary fastener nut 12 and an apertured sheet material 14 such as thin gauge sheet metal, which are shown unassembled in FIG. 1 in order to illustrate the structural features prior to joining to form the complete assembly joint 10, illustrated in FIG. 2. Referring again to FIG. 1, the sheet metal 14 is prefabricated, as hereinafter described, to form an aperture 16 having a peripheral, upstanding flange 18 integrally extending laterally from sheet 14.

Figure 2:
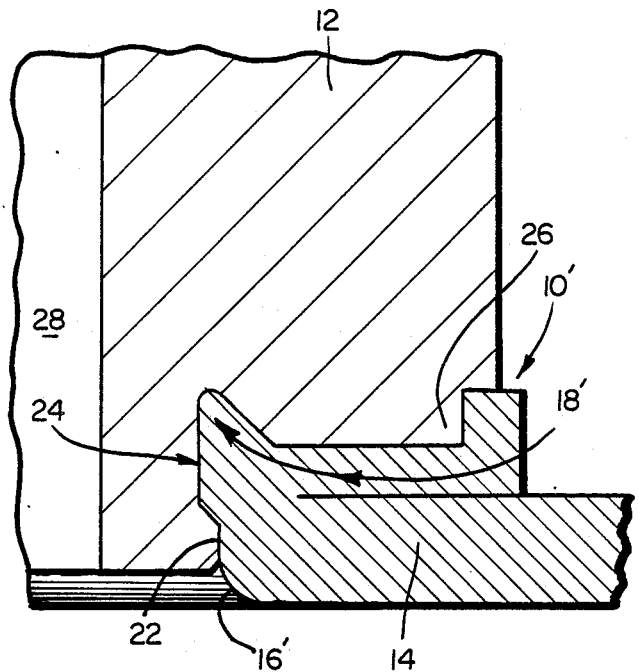
FIG. 2 is an enlarged, partially fragmentary sectional view of the completed, clinched joint assembled from the nut and apertured sheet metal of FIG. 1.

The fastening nut 12 is of a self-clinching type and may be constructed in accordance with the teaching of U.S. Pat. No. 3,967,699. The nut 12 includes an enlarged head 20 and an out-turned, annular lip 22 which forms the terminal shank end in the embodiment of the nut 12 illustrated in FIG. 1. An intermediate shank portion is provided which includes an annular locking groove 24 more fully described in the aforementioned U.S. Pat. No. 3,967,669, the disclosure of which is incorporated herein by reference. The locking groove 24 has a volume which is selected such that the amount of material displaced upon sealing of the fastener 12 will completely fill the groove to achieve the desired mechanical interlock shown in FIG. 2. The underside of the nut head 20 has a plurality of radially disposed protuberances or lobes 26 which embed in the upper surface of the bent-over flange 18' as shown in FIG. 2, to form additional mechanical interlock therewith which prevent or resist relative rotation of the nut 12 with respect to flange 18 and sheet metal 14 generally. In the illustrated embodiment, the nut 12 has a central, through bore 28 which can be unthreaded or threaded (not shown) depending upon the ultimate application of the fastener assembly. In some applications, the unthreaded nut will be tapped subsequent to mounting and clinching the fastener assembly 10'. Such a tapping operation will require high torque resistance provided by the mechanical interlock produced by the embedded lobes 26.

Figure 3:
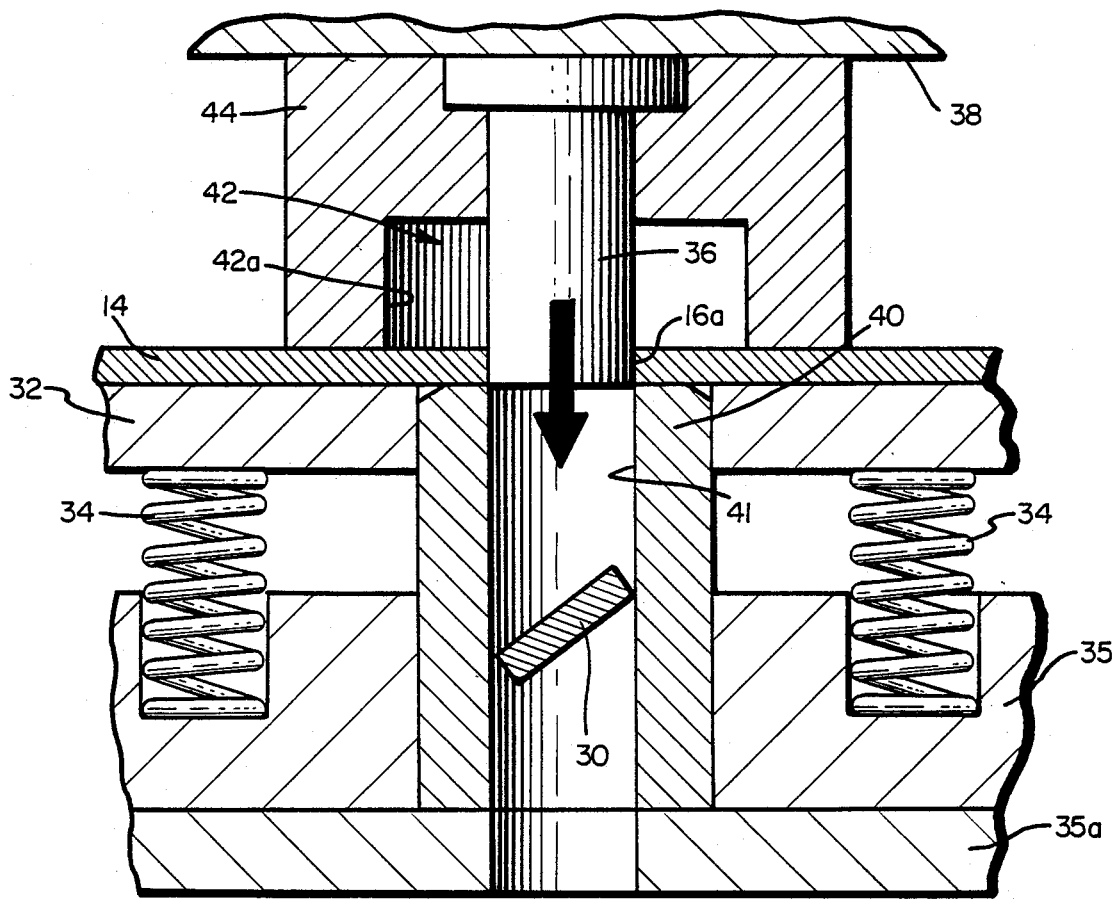
FIG. 3 is a vertical, sectional view of an embodiment of a tooling apparatus for fabricating the flanged sheet metal aperture of FIG. 1.

The sheet metal aperture 16 and flange 18 as shown in FIG. 1 are prefabricated preferably in two stamping operations described with reference to FIGS. 3 and 4. The fabricating operations in FIGS. 3 and 4 are preferably conducted in a single work station using the schematically illustrated tooling. Referring to FIG. 3, in the first prefabricating operation a pre-aperture 16a is punched through the sheet metal 14 removing the corresponding slug 30. In the illustrated tooling, the sheet metal 14 is held on a stripper plate 32 which is upwardly biased by spring suspension at 34 seated on a die shoe 35 and support base 35a. A pierce punch 36 is lowered on a vertically reciprocating punch shoe 38 to stamp the pre-aperture 16a. The punch resistance of the metal 14 is provided by a pierce die 40 which supports the periphery material of the pre-aperture 16a during punching. The pierce die 40 is annular in configuration and has a central bore 41 dimensioned to receive the lowered punch 36 as illustrated in both FIGS. 3 and 4. In the illustrated arrangement the die 40 is maintained stationary on the support base 35a.

Following the punching operation to form the pre-aperture 16a, the flange 18 is preferably immediately formed in the same work station as the punching operation in order to reduce cycle time and promote tooling registry as illustrated with reference to FIG. 4. The pierce punch 36 centrally projects through an open, annular die cavity 42 within a flange die 44 which is carried with the punch 36 on the vertically movable shoe 38.

The diameter of the cavity wall 42a and the outer diameter A of the smaller, annular pierce die 40 are dimensioned to provide a clearance space B which is approximately equal to the thickness of the thin sheet metal 14. By further lowering the flange die 44 against the sheet metal 14, progressive lowering forces the sheet metal 14 and the spring supported stripper plate 32 downwardly while at the same time the peripheral material of the pre-aperture 16a is pinched between the piece die 40 which remains relatively stationary and the lowering cavity wall 42a to form the flange 18 therebetween as the flange material is forced into the cavity 42 by the pierce die 40. Following this upward extrusion of the flange 18, the punch 36 and die 44 are upwardly withdrawn to allow the upward displacement of the sheet metal 14 on the biased stripper plate 32, and to allow releasing withdrawal of the flange 18 from the die 40.

In order to mount and clinch the fastener nut 12 onto the flange 18 and sheet metal 14, the sheet metal is moved to a second, staking work station described with reference to FIGS. 5–7. In the staking operation, the sheet metal 14 is supported on a lower staking die 46 having a central bore 48 aligned with the flanged aperture 16. Within the bore 48 guide pin 50 is axially movable, supported at its lower end by a biasing spring 52. The cylindrical body of the pin 50 has an outer diameter which is dimensioned for sliding engagement and biased projection upwardly through flange 18. The pin 50 has a concentric, cylindrical extension 50a which has a smaller diameter than the main body, and which fits through the bore 28 of the nut 12 which is mounted on the pin 50 to begin the staking operation.

Thereafter, as illustrated in FIG. 6, a ram or similar tool (not shown) forces the nut 12 downwardly under the yielding guidance of the pin 50 and extension 50a so that the nut lobes 26 engage and radially outwardly bend and displace the top of the flange 18. The nut lip 22 and the cylindrical wall of pin 50 reinforce the interior surface of the bending flange 18' so that continued downward bending results in the flange 18' bending approximately 90 degrees from the initial position in FIG. 5 into parallel seating on the surface of the contiguous, peripheral sheet metal 14 as shown in FIG. 7. This step of the staking operation thus produces a double thickness of the thin sheet metal below the nut lobes 16.

Referring again to FIG. 2, continued downward ramming of the nut 12 from the position of FIG. 7 forces the nut lobes 26 to displace and cold-deform the doubled thickness and particularly the flange material 18' radially inwardly to completely fill the annular locking groove 24 as the lobes 26 become embedded and interlocked in the bent flange 18'. After withdrawal of the guide pin 50 and extension 50a the completed staking operation produces the clinched fastener assembly 10' shown in FIG. 2. As a result of this staking operation, the dual mechanical interlock of the completed fastener assembly 10' resists both backing out of the nut 12 as well as relative rotation of the nut and sheet material under subsequently applied torque.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A joint assembly in which a fastener of the self-clinching type is secured to an apertured sheet material, comprising: a fastener including a head and shank portion with a locking groove formed in said shank; an apertured sheet material including a flanged circumferential periphery including an annular, bent-over portion thereof formed at the aperture to define engagement of dual layers of said peripheral material, wherein said fastener shank portion projects through said aperture and said fastener head is embedded within said bent-over portion of said peripheral material such that a portion of said peripheral material is disposed within said groove to form mechanical interlock therewith securing said joint assembly.

2. The joint assembly according to claim 1 wherein said mechanically interlocked portion of said peripheral material comprises a portion of said bent-over portion of said dual layers.

3. The joint assembly according to claim 1 wherein said fastener shank includes a terminal lip portion having a larger effective diameter than said shank.

4. The joint assembly according to claim 1 wherein said fastener head includes a plurality of radially disposed projections embedded into said peripheral material.

* * * * *